United States Patent
Delorme

(10) Patent No.: US 6,173,343 B1
(45) Date of Patent: Jan. 9, 2001

(54) DATA PROCESSING SYSTEM AND METHOD WITH CENTRAL PROCESSING UNIT-DETERMINED PERIPHERAL DEVICE SERVICE

(75) Inventor: Alexandre Delorme, Grenoble (FR)

(73) Assignee: Hewlett-Packard Company, Palo Alto, CA (US)

(*) Notice: Under 35 U.S.C. 154(b), the term of this patent shall be extended for 0 days.

(21) Appl. No.: 09/156,217

(22) Filed: Sep. 18, 1998

(30) Foreign Application Priority Data

Sep. 19, 1997 (EP) .................................................. 97410104

(51) Int. Cl.$^7$ .............................. G06F 13/00; G06F 13/14
(52) U.S. Cl. ................................ 710/48; 710/41; 710/46; 710/47; 710/131
(58) Field of Search .................................. 710/48, 46, 47, 710/131, 41

(56) References Cited

U.S. PATENT DOCUMENTS

| | | | |
|---|---|---|---|
| 4,691,239 | * 9/1987 | Nelson et al. | 358/282 |
| 5,414,858 | * 5/1995 | Hoffman et al. | 395/725 |
| 5,471,618 | 11/1995 | Isfeld . | |
| 5,535,418 | * 7/1996 | Suzuki | 395/845 |
| 5,555,414 | 9/1996 | Hough et al. . | |
| 5,896,561 | * 4/1999 | Schrader et al. | 455/67.1 |
| 5,922,051 | * 7/1999 | Sidey | 709/223 |
| 5,948,093 | * 9/1999 | Swanstrom et al. | 710/267 |

FOREIGN PATENT DOCUMENTS

407146797 * 6/1995 (JP) .................................. G06F/9/46

OTHER PUBLICATIONS

European Search Report, EP 97 41 0104, Mar. 12, 1998.
IBM Technical Disclosure Bulletin, vol. 38, No. 09A, Sep. 1993, pp 83–84, "Adaptive Polling Algorithm for Monitoring Multi–media Devices".

* cited by examiner

Primary Examiner—Thomas C. Lee
Assistant Examiner—Rehana Perveen

(57) ABSTRACT

Data processing apparatus is described comprising a processor and at least one peripheral device. The processor is arranged to service the peripheral device either in an interrupt mode in which the peripheral device is serviced in response to interrupt signals generated by the peripheral device or in a timed mode in which the peripheral device is periodically polled and serviced if required. The apparatus has a dynamic switching arrangement for switching from the interrupt mode to the timed mode depending upon conditions dynamically determined within the apparatus, at least one of said conditions being that the rate at which the peripheral device generates interrupt signals exceeds a predefined or programmable threshold frequency. The rate of polling in the timed mode is less than the threshold frequency. Thus, dynamic switching between a interrupt driven mode and a timed mode is used in order to make more efficient use of shared system resources by servicing peripheral devices only periodically at times of high demand.

9 Claims, 4 Drawing Sheets

DATA PROCESSING SYSTEM AND METHOD WITH CENTRAL PROCESSING UNIT-DETERMINED PERIPHERAL DEVICE SERVICE

FIELD OF THE INVENTION

The present invention relates generally to data processing apparatus comprising a processor and at least one peripheral device and, more particularly, to such apparatus in which the processor is arranged to service the peripheral device either in an interrupt mode in which the peripheral device is serviced in response to interrupt signals generated by the peripheral device or in a timed mode in which the peripheral device is periodically polled and serviced if required, the apparatus having a switching arrangement for switching from the interrupt mode to the timed mode depending upon conditions dynamically determined within the apparatus, at least one of said conditions being that the rate at which the peripheral device generates interrupt signals exceeds a predefined or programmable threshold frequency.

BACKGROUND OF THE INVENTION

A data processing system of the above-described general type is proposed in U.S. Pat. No. 5,414,858. In the computer system described in that patent the latency associated with interrupt processing is said to be relatively high since the interrupt signals initiate operating system routines that are relatively time consuming. On the other hand, the latency associated with polling is said to be relatively low, since the frequency of the polling can be made relatively fast.

In consequence, the patent proposes dynamically switching from an interrupt driven mode to a polling mode in order to reduce latency.

However, the power of modern processors means that the latency associated with interrupt driven processing is sufficiently low so as not to be significant for some applications. Nevertheless, even in powerfull modern computer systems, interrupt processing still involves a performance overhead for the computer, for example since data associated with the task or tasks the computer is performing when it receives the interrupt need to be saved and then restored once the interrupt routine has terminated.

The problem with the approach proposed in U.S. Pat. No. 5,414,858 is that, in at least some applications, the use of fast polling can also use significant processor resources and therefore the dynamic switching approach proposed would not necessarily provide any improvement in overall efficiency.

The object of this invention is to provide an improved technique for managing the servicing of peripheral devices in computer systems and which mitigates the above described drawback of the prior art.

SUMMARY OF THE INVENTION

This invention provides a data processing system of the above described type characterised in that the rate of polling in the timed mode is less than the threshold frequency. In this way, the load on the processor caused by frequent interrupts is reduced.

Thus, dynamic switching between a interrupt driven mode and a timed mode is not used in order to reduce latency, but rather in order to make more efficient use of shared system resources by servicing peripheral devices only periodically at times of high demand.

Such an approach is particularly suitable for Input/Output (I/O) devices which exhibit a wide variation over time in the level of service they require.

In preferred embodiments, the apparatus is arranged to handle, if required, a plurality of service events in each cycle in the timed mode. In this way, the overall number of service events handled is not reduced, rather the handling of the events is scheduled so as to make more efficient use of shared system resources.

In this case, the dynamic switching arrangement can be arranged to switch from the timed mode to the interrupt mode when the number of service events handled within each polling cycle falls below a predefined or programmable threshold.

In one embodiment, the dynamic switching arrangement is arranged to measure the number of service events within each polling cycle and to switch to the interrupt mode when the number of service events handled within each polling cycle is below a predefined or programmable threshold for a predefined or programmable number of consecutive cycles.

Similarly, the dynamic switching arrangement can be arranged, when in the interrupt mode, to measure the time interval between each interrupt and to switch to the timed mode when the time interval between each interrupt is below a predefined or programmable threshold for a predefined or programmable number of consecutive received interrupts.

In one application for which the above technique is particularly suited, the peripheral device is a network adapter including a buffer memory and means to receive and store in the buffer memory frames of data received from a data communications network. In the following, the word frame will be used as a generic term to describe the units in which data is transferred across any particular network, although it will be appreciated that the proper technical term for such units may vary in different network systems. In this case, the service events referred to above are the frames of data received from the network requiring storage in a data storage device. In this implementation, the adapter is settable either to transmit or not to transmit an interrupt signal to the processor whenever a frame of data is received from the network and the switching arrangement comprises means to set the network adapter not to transmit the interrupt signal upon switching to the timed mode.

Viewed from another aspect, the invention also provides a method for operating data processing apparatus comprising a processor and at least one peripheral device, the method comprising servicing the peripheral device either in an interrupt mode in which the peripheral device is serviced in response to interrupt signals generated by the peripheral device or in a timed mode in which the peripheral device is periodically polled and serviced if required, and dynamically switching from the interrupt mode to the timed mode depending upon conditions dynamically determined within the apparatus, at least one of said conditions being that the rate at which the peripheral device generates interrupt signals exceeds a predefined or programmable threshold frequency, wherein the rate of polling in the timed mode is less than the threshold frequency.

Also provided is a computer program product for execution on data processing apparatus comprising a processor and at least one peripheral device to carry out the above-described method.

BRIEF DESCRIPTION OF THE DRAWINGS

A data communications system embodying the invention will now be described, by way of non-limiting example, with reference to the accompanying diagrammatic drawings, in which.

BEST MODE OF CARRYING OUT THE INVENTION

A network adapter is an interface device that is located between a data communications network and a computer to be connected to the network. Data flows between the computer and the network in both directions, typically in units of fixed or variable size known as data packets or frames.

In general, one of the functions a network adapter has to perform is to deliver in a timely manner data frames received from the network to main memory in the computer, where they can be processed by an application program.

Conventionally, network adapters have used interrupt driven mechanisms to transfer data from the adapter to the computer. This means that when a data frame is received by the adapter and stored in its buffer, processing in the computer is interrupted and an interrupt routine performed which transfers the incoming frame to the main storage of the computer.

Interrupt processing involves a performance overhead for the computer because, for example, data associated with the task or tasks the computer is performing when it receives the interrupt need to be saved and then restored once the interrupt routine has terminated.

If the rate at which frames are received is too high then this overhead can account for a significant proportion of the resources of the machine.

Described here is an adaptive switching technique implemented as part of a physical driver for a network adapter which makes more efficient use of system resources.

Figure 1:
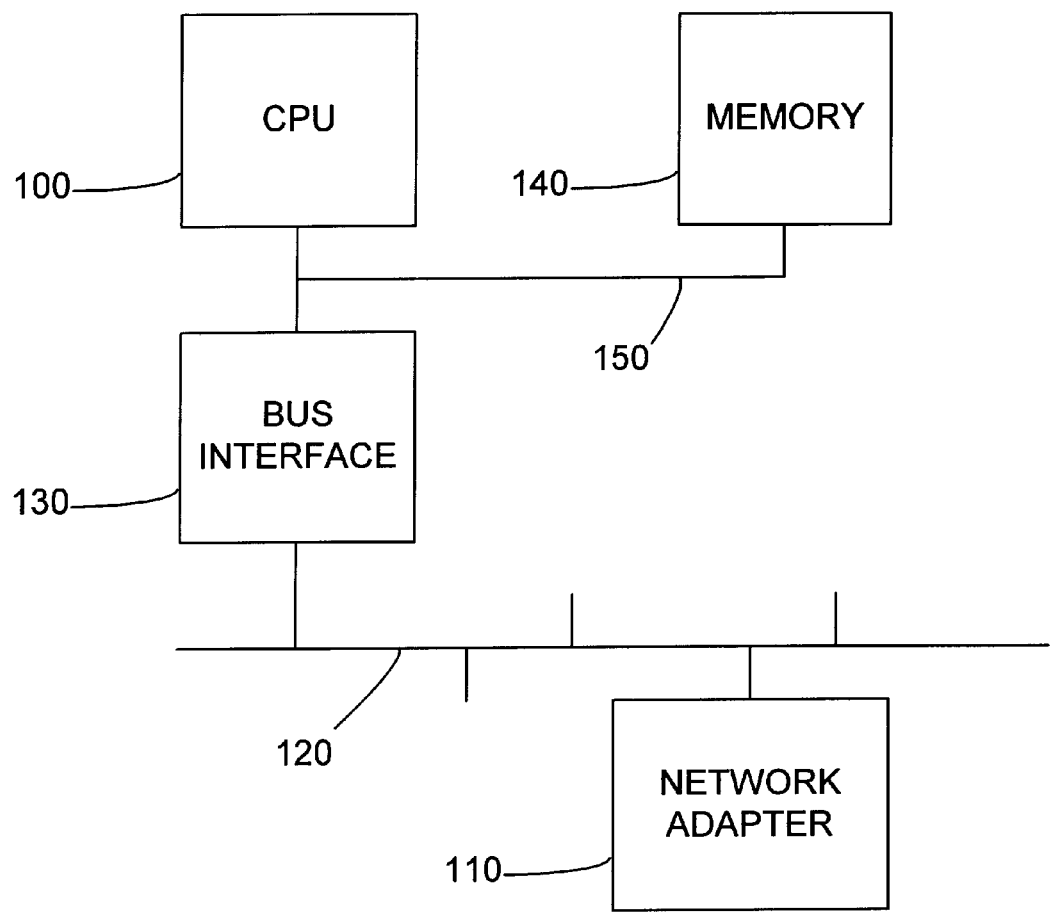
FIG. 1 is a schematic diagram showing a data processing system.

Referring to FIG. 1, there is shown a data processing system comprising a central processing unit (CPU) 100 and a network adapter card 110 interconnected by a bus 120.

In this implementation, bus 120 is the well known Personal Computer Interconnect (PCI) bus which is widely used in personal computers. CPU 100 is connected to bus 120 via bus interface 130. In conventional fashion, CPU 100 is connected to main system memory 140 via local processor bus 150.

Figure 2:
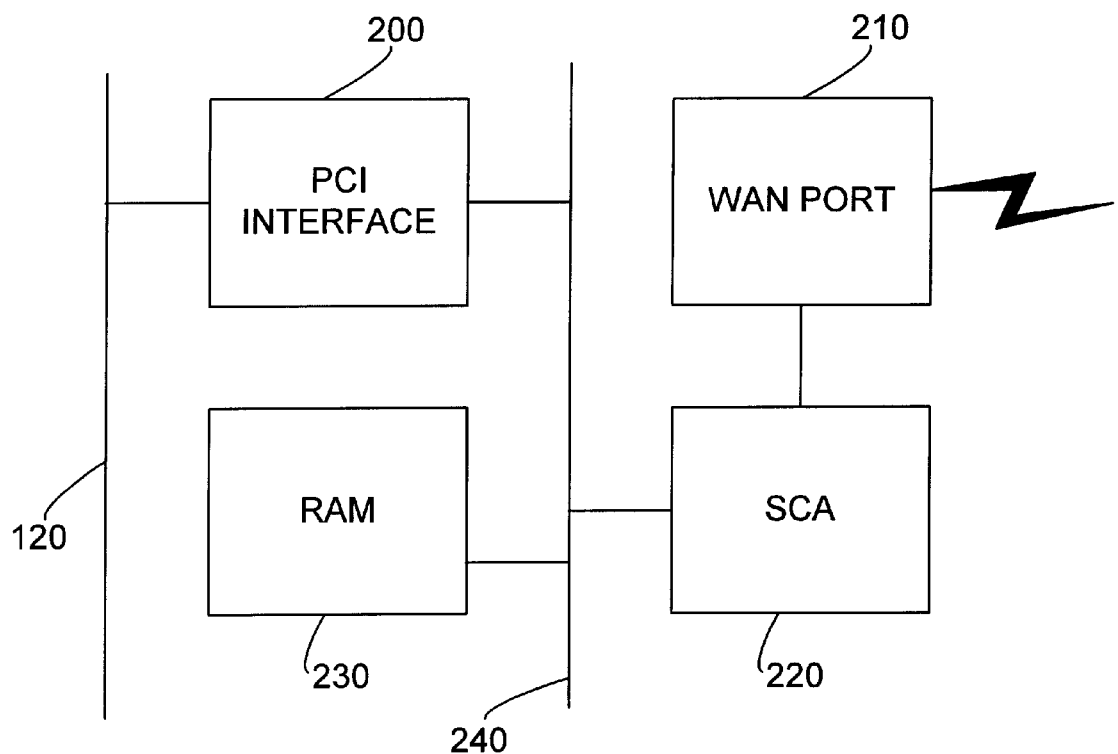
FIG. 2 is a schematic diagram showing the network adapter in the system of FIG. 1.

FIG. 2 shows in more detail the structure of network adapter card 110. Adapter 110 comprises PCI interface unit 200 and a wide area network (WAN) interface 210 which includes appropriate network line drivers and receivers for interfacing with a wide area network using standard physical layer interfaces such as RS232C, RS449, RS530, V35 or X21.

Also included in network adapter card 110 is RAM 230 which serves as a buffer memory and a Serial Communication Adapter (SCA) control unit 220 which controls the protocols used on the network lines. Serial Communication Adapter (SCA) control unit 220 includes a DMA controller (not shown) for transferring data to RAM 230. PCI interface unit 200 includes target only PCI interface logic and a memory controller for controlling RAM 230 (not shown). These units are interconnected by local bus 240. It will be recognised by those skilled in the art that network adapter cards having this general structure are widely commercially available.

Figure 3:
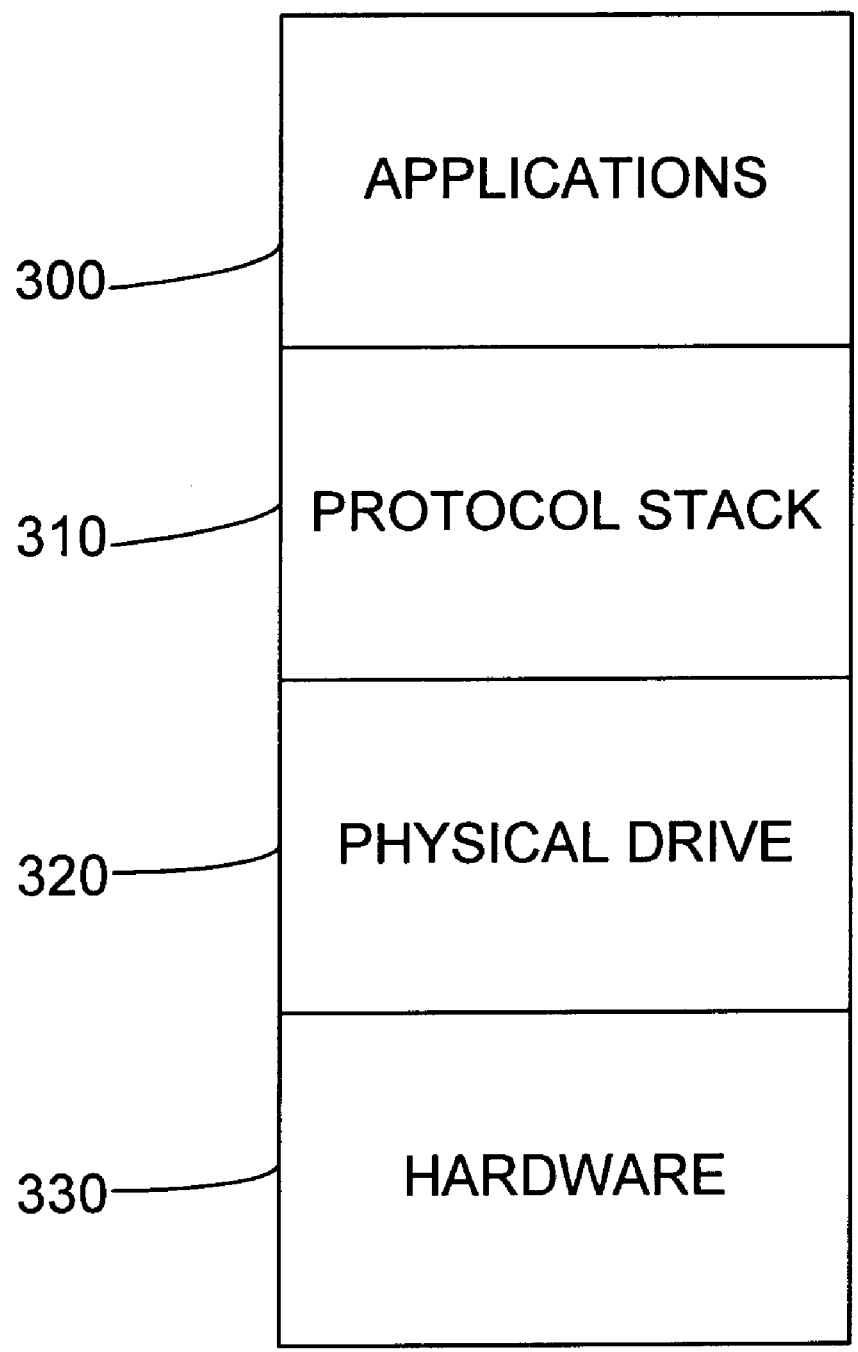
FIG. 3 illustrates a software structure in the system of FIG. 1.

FIG. 3 is a schematic diagram showing the layered structure of the communication software which executes on CPU 100 in this implementation. Such a layered structure will be very familiar to those skilled in the art. Application programs represented at 300 interface directly to a protocol stack 310. Protocol stack 310 may be for example an implementation of an X25 or frame relay protocol. Protocol stack 310 interfaces to a physical driver software 320. The role of the physical driver 320 is to interface directly to the hardware of the adapter card 110 indicated in FIG. 3 at 330.

The general operation of the system described above will be well understood by those skilled in the art and need not be described in any more detail here.

The present invention is implemented in the interrupt handing procedures of the data reception algorithm of physical driver software 320 as will be described below.

The performance of the data reception algorithm is critical since the functionality of adapter card 110 is somewhat limited. In particular, adapter card 110 does not have the capability to directly transfer data to system memory 140. Rather, CPU 100 must read each inbound data frame from card memory 230 and transfer it to system memory 140. If adapter card 100 uses, as is conventional, a host interrupt to initiate such a transfer, then at a typical data transfer rate such as 4 Mbps, and with a frame size of 128 bytes, the host cpu would be interrupted every 300 microseconds.

The reception algorithm of the physical driver software is able to reduce this number of interrupts using a timer. The basic frame reception process is as follows. When adapter 110 receives a data frame it is placed in card memory 230. Adapter 110 is settable so that on receipt of a data frame it sends an interrupt signal to CPU 100 which executes an interrupt routine in physical driver software 320.

The interrupt routine of physical driver software 320 operates in two modes—an interrupt mode in which the adapter sends an interrupt signal to CPU 100 whenever it receives a data frame and a timed mode in which the adapter is set so as not to send any interrupts to the CPU 100, rather host interrupts are generated periodically under the control of the physical driver software routine. In either case the same interrupt routine is executed by the CPU 100.

Figure 4:
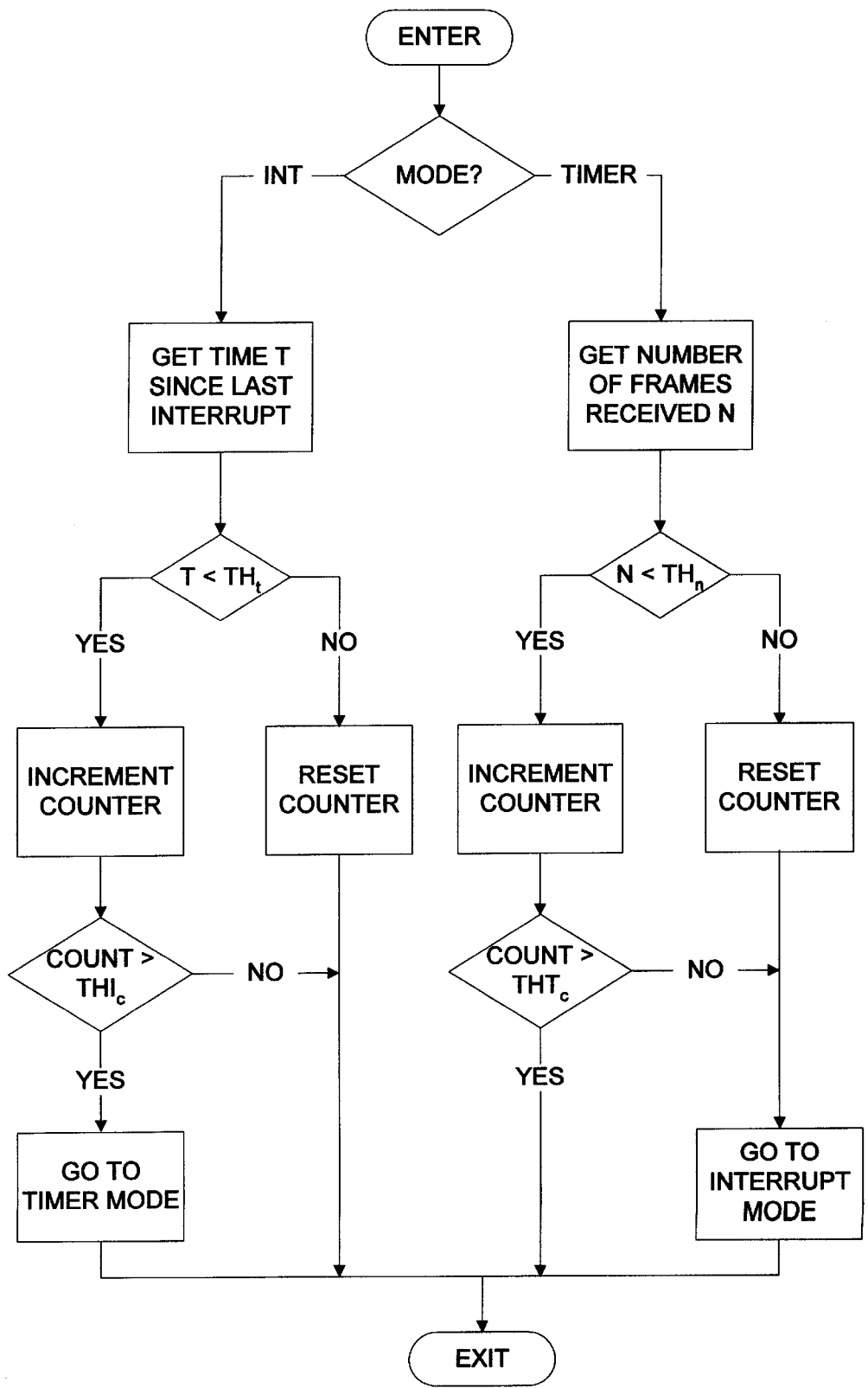
FIG. 4 is a flow diagram showing the operation of an interrupt routine in the system of FIG. 1.

FIG. 4 is a flow chart showing the interrupt routine. It can be seen that the switching between the two modes is governed by the timer period T and four threshold parameters. $TH_t$, $TH_n$, $THI_c$ and $THT_c$.

In the timed mode, the number of data frames transferred to memory 140 within each polling cycle is measured. The driver switches to interrupt mode if the number of service events handled within each polling cycle is below a programmable threshold $TH_n$ for a programmable number $THT_c$ of consecutive cycles.

In the interrupt mode, the time interval between each interrupt is measured. The driver switches to the timed mode when the time interval between each interrupt is below a programmable threshold $TH_t$ for a programmable number of consecutive received interrupts $THI_c$.

Of course, it is possible that in some implementations any of the four parameters $TH_t$, $TH_n$, $THI_c$ and $THT_c$ may be fixed.

In general, the timer period T needs to be longer than the threshold $TH_t$ for the period between interrupts so that the overall number of interrupts is reduced. It will be understood that the threshold $TH_t$ effectively defines a threshold frequency for the rate of frame receipt above which the driver will switch to operate in timed mode. The threshold $TH_n$ defines a second threshold frequency, which may be the same as or different from that defined by $TH_r$. The algorithm described above provides allows a degree of inertia in the switching to avoid excessive and unnecessary switching between the two modes. The count thresholds $THT_c$ and $THI_c$ ensure that any change in the rate of receipt of frames needs to endure for a certain time before initiating a switch from one mode to the other.

The maximum latency that can be permitted for frame receipt determines an upper bound to the timer period T.

For example, timer period T may be set to 1 mS so that at the highest data transfer rate of 4 Mbps, 3 or 4 128-byte frames are transferred in each cycle in the timed mode. In this example, $TH_t$ might be set to 500 microseconds and $THI_c$ to 10, so that if more than 10 consecutive frames are received with a spacing of less than 500 microseconds, the driver switches to the timed mode. $TH_n$ might be set to 1 and $THT_c$ to 10, so if in more than 10 consecutive timer periods less than 1 frame is handled then the driver switches back to interrupt mode.

Of course, the parameters T, $TH_t$, $TH_n$, $THI_c$ and $THT_c$ may all be adjusted so as to optimise the performance according to expected network traffic conditions and or processor load. This adjustment could, for example, be carried out manually by a user as part of a system set up process or could be carried out dynamically by either an application program or the physical driver software itself.

It will be appreciated that the physical driver software of the present embodiment takes the form of a computer program which may be marketed in the form of a suitable computer program product including the functionality described. It will be appreciated that the invention may equally be implemented as special purpose hardware or any combination of software and hardware.

Although a specific embodiment of the invention has been described, the invention is not to be limited to the specific arrangement so described. The invention is limited only by the claims.

What is claimed is:

1. Data processing apparatus comprising a processor and at least one peripheral device, the processor being arranged to service the peripheral device either in an interrupt mode in which the peripheral device is serviced in response to interrupt signals generated by the peripheral device or in a timed mode in which the peripheral device is periodically polled and serviced if required, the apparatus having a dynamic switching arrangement for switching from the interrupt mode to the timed mode depending upon conditions dynamically determined within the apparatus, at least one of said conditions being that the rate at which the peripheral device generates interrupt signals exceeds a predefined or programmable central processing unit-determined threshold frequency, wherein the rate of polling in the timed mode is less than the threshold frequency.

2. Data processing apparatus as claimed in claim 1 wherein, in the timed mode, the apparatus is arranged to, if required, handle a plurality of service events in each cycle.

3. Data processing apparatus as claimed in claim 2 wherein the dynamic switching arrangement is arranged to switch from the timed mode to the interrupt mode when the number of service events handled within each polling cycle falls below a predefined or programmable central processing unit-determined threshold.

4. Data processing apparatus as claimed in claim 3 wherein the dynamic switching arrangement is arranged to measure the number of service events within each polling cycle and to switch to the interrupt mode when the number of service events handled within each polling cycle is below a predefined or programmable central processing unit-determined threshold for a predefined or programmable number of consecutive cycles.

5. Data processing apparatus as claimed in claim 1 wherein the dynamic switching arrangement is arranged, when in the interrupt mode, to measure the time interval between each interrupt and to switch to the timed mode when the time interval between each interrupt is below a predefined or programmable central processing unit-determined threshold for a predefined or programmable number of consecutive received interrupts.

6. Data processing apparatus as claimed in claim 2 including a data storage device and wherein the peripheral device is a network adapter including a buffer memory and means to receive and store in the buffer memory frames of data received by the adapter from a data communications network, the service events being the frames of data received from the network requiring storage in the data storage device, wherein the adapter is settable either to transmit or not to transmit an interrupt signal to the processor whenever a frame of data is received from the network, the switching arrangement comprising means to set the network adapter not to transmit the interrupt signal upon switching to the timed mode.

7. Data processing apparatus as claimed in claim 1 comprising means for setting at least one of the polling rate and the central processing unit-determined threshold according to conditions dynamically determined within the apparatus.

8. A method for operating data processing apparatus comprising a processor and at least one peripheral device, the method comprising servicing the peripheral device either in an interrupt mode in which the peripheral device is serviced in response to interrupt signals generated by the peripheral device or in a timed mode in which the peripheral device is periodically polled and serviced if required, and dynamically switching from the interrupt mode to the timed mode depending upon conditions dynamically determined within the apparatus, at least one of said conditions being that the rate at which the peripheral device generates interrupt signals exceeds a predefined or programmable central processing unit-determined threshold frequency, wherein the rate of polling in the timed mode is less than the threshold frequency.

9. A computer program product for execution on data processing apparatus comprising a processor, at least one peripheral device, and means for servicing the peripheral device either in an interrupt mode in which the peripheral device is serviced in response to interrupt signals generated by the peripheral device or in a timed mode in which the peripheral device is periodically polled and serviced if required, the program product comprising program logic for dynamically switching from the interrupt mode to the timed mode depending upon conditions dynamically determined within the apparatus, at least one of said conditions being that the rate at which the peripheral device generates interrupt signals exceeds a predefined or programmable central processing unit-determined threshold frequency, wherein the rate of polling in the timed mode is less than the threshold frequency.

* * * * *